US010634915B2

(12) United States Patent
Yokoyama

(10) Patent No.: US 10,634,915 B2
(45) Date of Patent: Apr. 28, 2020

(54) IMAGE DISPLAY DEVICE

(71) Applicant: SEIKO EPSON CORPORATION, Tokyo (JP)

(72) Inventor: Osamu Yokoyama, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 295 days.

(21) Appl. No.: 15/460,646

(22) Filed: Mar. 16, 2017

(65) Prior Publication Data
US 2017/0276946 A1 Sep. 28, 2017

(30) Foreign Application Priority Data
Mar. 24, 2016 (JP) ................. 2016-059676

(51) Int. Cl.
G02B 27/01 (2006.01)
G02B 5/04 (2006.01)
G02B 5/10 (2006.01)
G02B 17/08 (2006.01)

(52) U.S. Cl.
CPC .......... *G02B 27/0172* (2013.01); *G02B 5/04* (2013.01); *G02B 5/10* (2013.01); *G02B 17/0856* (2013.01); *G02B 2027/0178* (2013.01)

(58) Field of Classification Search
CPC .... G02B 27/01–0189; G02B 5/04–045; G02B 2027/0178; G02B 17/0856; G02B 5/10; G02B 27/017; G02B 27/0172
USPC ....................................................... 359/631
See application file for complete search history.

(56) References Cited

U.S. PATENT DOCUMENTS

| 5,513,041 | A | 4/1996 | Togino |
| 6,046,857 | A | 4/2000 | Morishima |
| 6,111,701 | A * | 8/2000 | Brown ............... G02B 27/0025 359/634 |
| 6,353,503 | B1 | 3/2002 | Spitzer et al. |
| 8,079,713 | B2 * | 12/2011 | Ashkenazi ............... G02B 5/32 353/33 |
| 2003/0030912 | A1 * | 2/2003 | Gleckman .......... G02B 27/0172 359/633 |
| 2009/0147331 | A1 * | 6/2009 | Ashkenazi ............... G02B 5/32 359/13 |
| 2012/0026455 | A1 * | 2/2012 | Takahashi .......... G02B 17/0848 351/158 |
| 2015/0185481 | A1 | 7/2015 | Hiraide |

(Continued)

FOREIGN PATENT DOCUMENTS

| JP | H05-134208 A | 5/1993 |
| JP | H07-218859 A | 8/1995 |
| JP | H09-181999 A | 7/1997 |

(Continued)

*Primary Examiner* — William R Alexander
(74) *Attorney, Agent, or Firm* — Oliff PLC

(57) ABSTRACT

An image display device of the embodiment includes an image generation portion that emits image light, a prism optical element into which the image light enters, and a light guide optical system that guides the image light to the prism optical element. The prism optical element includes a prism member having a light refractive surface formed of a flat surface provided on a light incident side of the image light, and a concave mirror provided opposite the light refractive surface of the prism member and having a shape that is concave away from the light refractive surface.

6 Claims, 6 Drawing Sheets

(56) References Cited

U.S. PATENT DOCUMENTS

2019/0049732 A1\* 2/2019 Lee .......................... G02B 5/30

FOREIGN PATENT DOCUMENTS

| JP | H09-189880 A | 7/1997 |
| JP | 2001-166211 A | 6/2001 |
| JP | 2003-502711 A | 1/2003 |
| JP | 2012-208193 A | 10/2012 |
| JP | 2015-125222 A | 7/2015 |

\* cited by examiner

IMAGE DISPLAY DEVICE

BACKGROUND

1. Technical Field

The present disclosure relates to an image display device.

2. Related Art

In recent years, wearable display devices such as head mounted displays (hereinafter referred to as HMDs) have been attracting attention. As such HMDs, there is known an HMD that uses concave mirrors as an ocular optical system that guides image light to the front of the eyes of a viewer (see, for example, JP-A-5-134208).

When concave mirrors are used, the field angle needs to be increased in order for the viewer to visually recognize a large image. To increase the field angle as described above, the curved surface of the concave mirror is arranged closer to the face of the viewer on the nose side, and away from the face on the ear side. When the amount of forward protrusion of the concave mirror is large on the ear side of the viewer, the external design of the device is impaired. Therefore, it is also conceivable to arrange the concave mirror in an inclined posture so as to reduce the amount of protrusion while maintaining a sufficient field angle. In this case, however, an image light generation portion that generates image light or a light guide system that guides the image light to the concave mirror may be brought into contact with the head of the viewer.

SUMMARY

An advantage of some aspects of the embodiment is to provide an image display device that allows a viewer to visually recognize a large image without impairing the external appearance of the device while suppressing contact between the image display device and the head of the viewer.

According to a first aspect of the embodiment, there is provided an image display device including an image generation portion that emits image light, and a prism optical element into which the image light enters. The prism optical element includes a first prism member having a first light refractive surface with a shape of a flat surface, and a concave mirror provided opposite the first light refractive surface of the first prism member and having a shape that is concave away from the first light refractive surface. The prism optical element is arranged so that the image light enters the prism optical element through the first light refractive surface and is reflected by the concave mirror.

With the image display device according to the first aspect, the image light can be refracted by the first light refractive surface of the prism optical element. Thus, an excellent external design is not impaired because the mirror protrusion amount of the concave mirror is reduced while maintaining a wide field angle, and further, the image generation portion and the light guide optical system can be arranged at positions where neither the image generation portion nor the light guide optical system is in contact with the head of the user.

Accordingly, the image display device allows the viewer to visually recognize a large image without impairing the external appearance of the device while suppressing the contact between the image display device and the head of the viewer.

In the first aspect, it is preferred that the image display device further include a light guide optical system that guides the image light to the prism optical element, and that the light guide optical system include a plurality of lenses.

With this structure, aberrations that may be caused by refraction when the light enters the prism optical element can be corrected by the light guide optical system.

Further, in the first aspect, it is desired that the light guide optical system further include a reflective mirror that is provided between the plurality of lenses and reflects the image light.

With this structure, the optical axis of the image light can be bent by the reflective mirror. Thus, the light guide optical system is arranged along the face of the viewer, and hence the external design of the device can be enhanced.

In the first aspect, it is preferred that the prism optical element further include a second prism member provided opposite the first prism member with respect to the concave mirror, the second prism member having a refractive index equal to a refractive index of the first prism member, that the second prism member have a second light refractive surface provided opposite the concave mirror parallel to the first light refractive surface, and that the concave mirror be a partially reflective film that reflects at least a part of the image light and causes at least a part of light in an external environment to pass therethrough.

With this structure, the light incident surface and the light exit surface of the light from the external environment are parallel flat surfaces, and hence there is no change between an angle of the light beam that enters the prism optical element from the external environment and an angle of the light beam that exits after being refracted by the prism optical element. Thus, the user of the image display device can visually recognize, without distortion, the image of the external environment (see-through image) that is viewed through the concave mirror.

In the first aspect, it is preferred that the partially reflective film be an amplitude-division reflective film.

With this structure, the user of the image display device can visually recognize the image of the external environment (see-through image) through the concave mirror satisfactorily.

In the first aspect, it is preferred that the partially reflective film be a wavelength-division reflective film.

With this structure, the user of the image display device can visually recognize the image of the external environment (see-through image) through the concave mirror satisfactorily.

BRIEF DESCRIPTION OF THE DRAWINGS

The embodiment will be described with reference to the accompanying drawings, wherein like numbers reference like elements.

DESCRIPTION OF EXEMPLARY EMBODIMENTS

Figure 1:
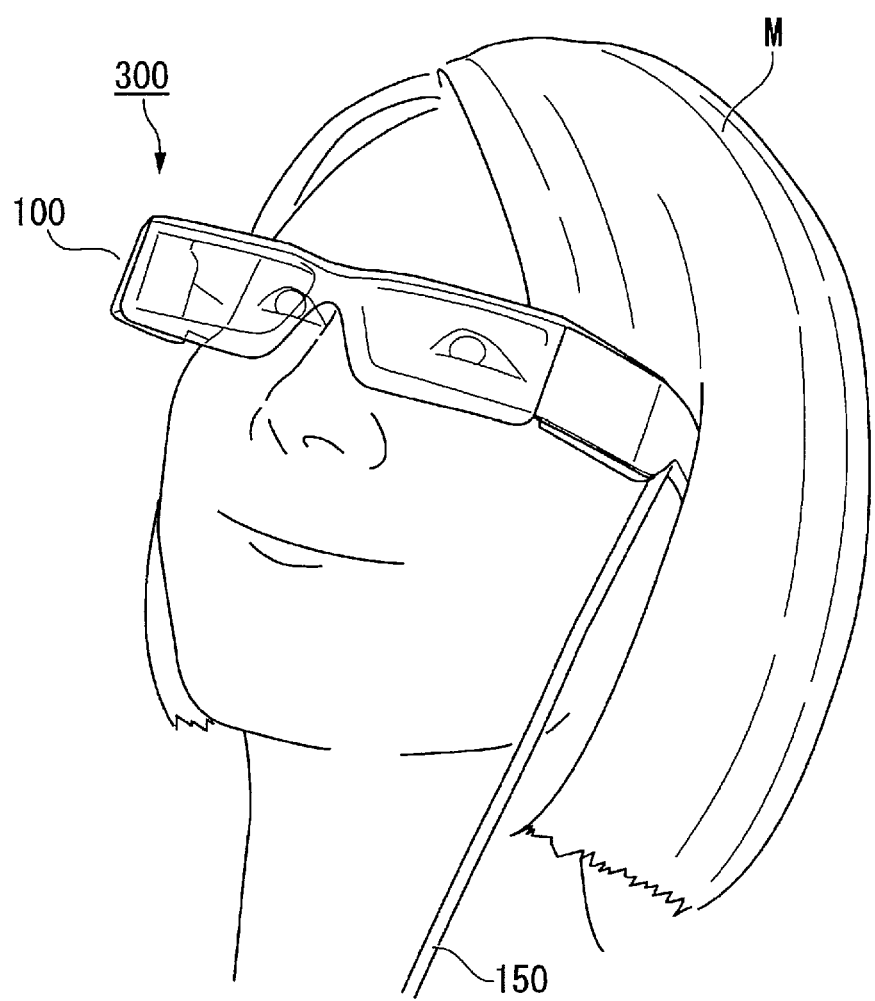
FIG. 1 illustrates a state in which a user wears an HMD of a first embodiment.

Embodiments are described below in detail with reference to the drawings. In the drawings to be used for the following description, characteristic portions may be illustrated on an enlarged scale for convenience in order to facilitate understanding of the features, and hence the ratios of the dimensions of respective components, and the like are not necessarily identical to those of actual components.

First Embodiment

An image display device of this embodiment is an example of a head mounted display to be worn around the head of a user when in use. In the following description, the head mounted display is abbreviated as HMD.

Figure 2:
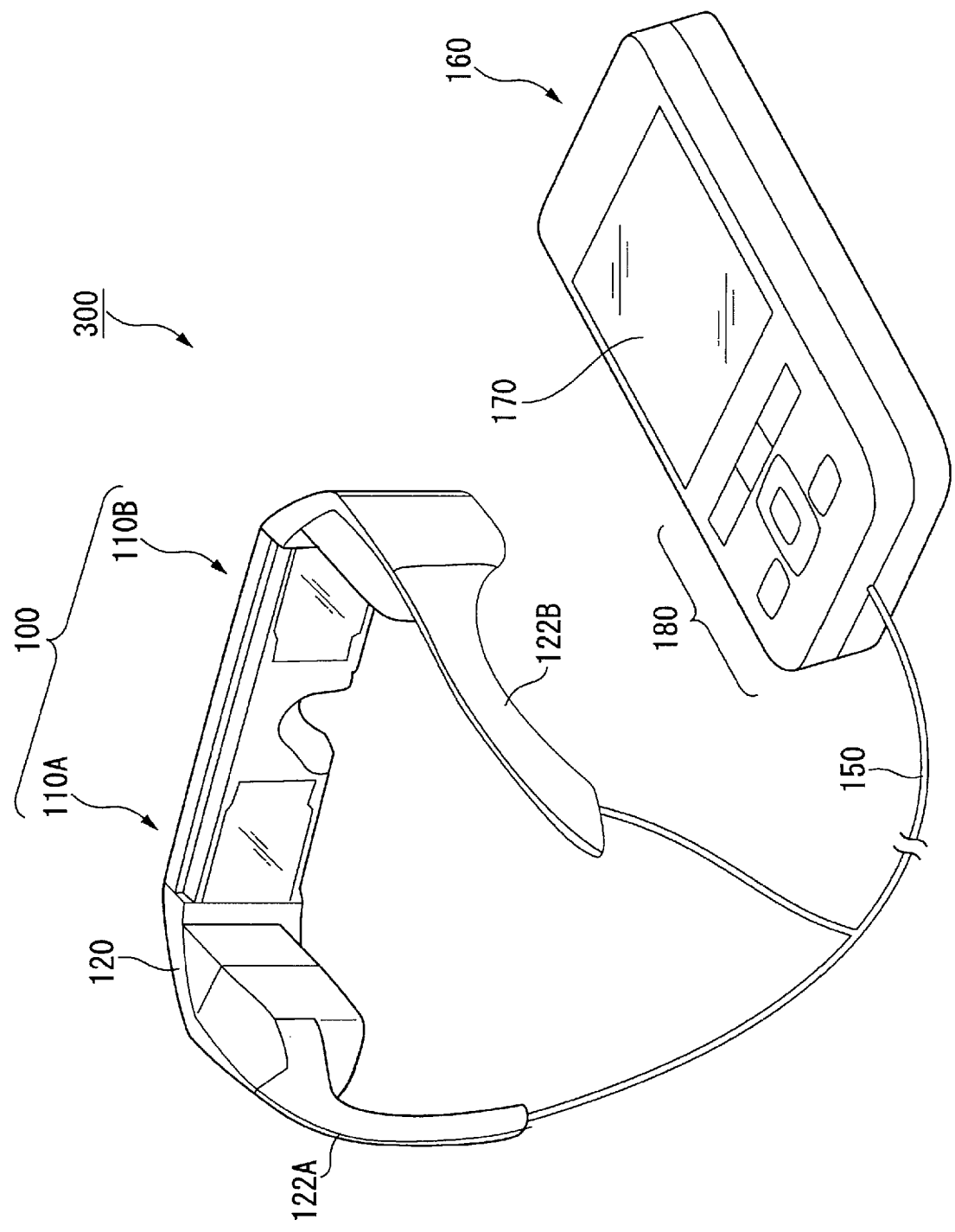
FIG. 2 is a perspective view of the HMD of the first embodiment.

FIG. 1 illustrates a state in which the user wears the HMD of this embodiment. FIG. 2 is a perspective view of the HMD of this embodiment.

As illustrated in FIG. 1, when in use, an HMD 300 of this embodiment is worn around the head of the user in the same way that the user wears glasses. The HMD 300 of this embodiment is a reflective HMD. With the HMD 300 of this embodiment, the user can visually recognize an image generated by image display sections.

As illustrated in FIG. 2, the HMD 300 includes a display unit 100 having a shape similar to that of glasses, and a control device (controller) 160 having such a size that the user can hold the control device 160 with their hand. The display unit 100 and the control device 160 are connected to each other so that wired or wireless communication can be performed therebetween. In this embodiment, a left-eye image display section 110A and a right-eye image display section 110B constituting the display unit 100 are each connected to the control device 160 through a cable 150 so that wired communication can be performed therebetween. In this way, the left-eye image display section 110A and the right-eye image display section 110B each communicate image signals and control signals with the control device 160.

The display unit 100 includes a main frame (device body) 120, the left-eye image display section 110A, and the right-eye image display section 110B. The control device 160 includes a display unit 170 and an operation button unit 180.

The display unit 170 displays, for example, various kinds of information and instructions to be provided to the user. The main frame 120 includes a pair of temple sections 122A and 122B to be hooked on the ears by the user. The main frame 120 is a member that supports the left-eye image display section 110A and the right-eye image display section 110B.

Figure 3:
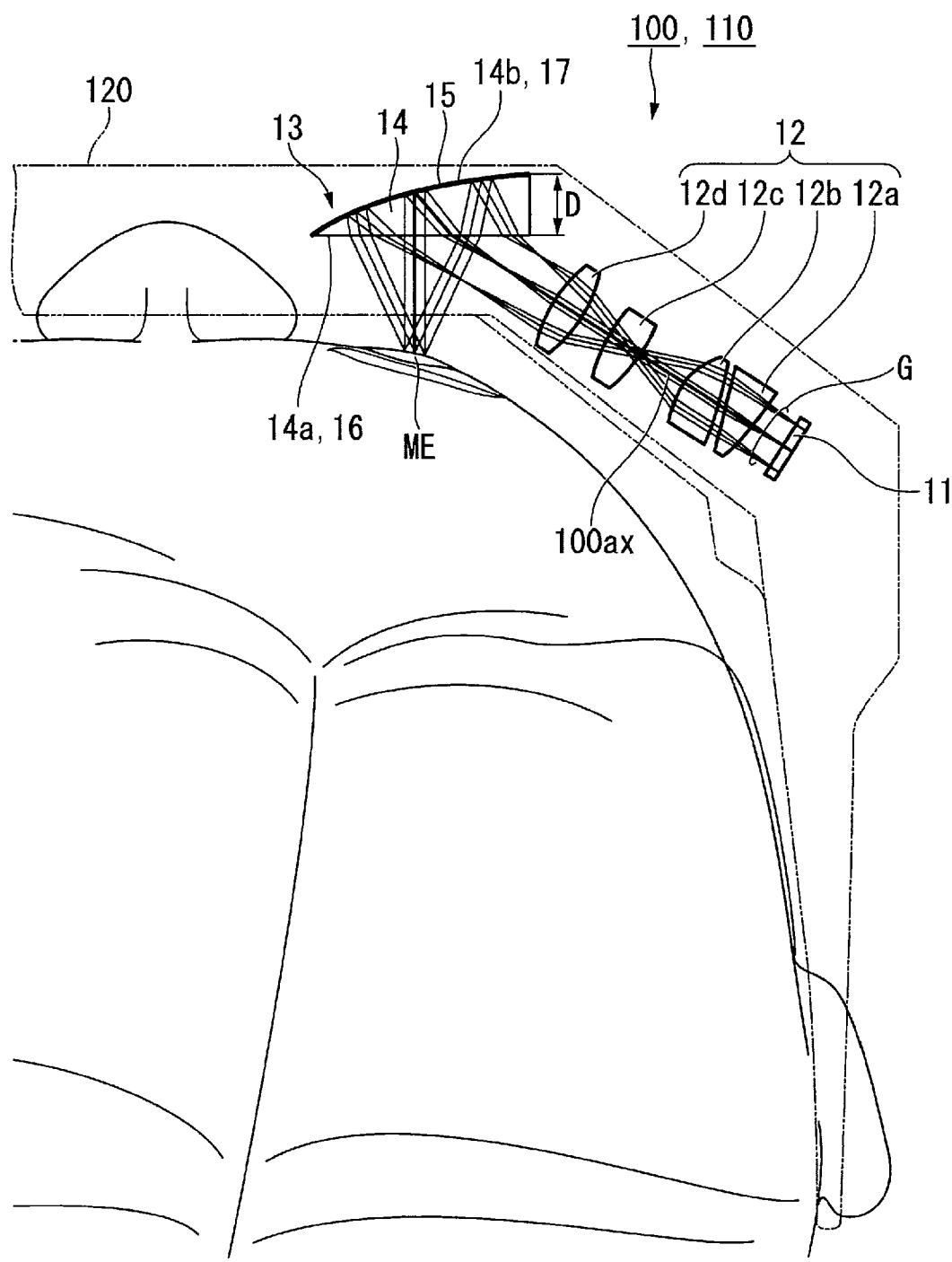
FIG. 3 illustrates the structure of an image display section of the first embodiment.

FIG. 3 is a plan view illustrating the structure of each portion of the display unit 100. Further, FIG. 3 illustrates a state in which a user M who is wearing the display unit 100 is viewed from the top of the head.

The right-eye image display section 110B and the left-eye image display section 110A have the same structure, and hence components inside both the image display sections are arranged in a bilaterally symmetrical manner. Therefore, the right-eye image display section 110B is described below in detail while being referred to simply as image display section 110, and description of the left-eye image display section 110A is omitted. In FIG. 3, a path of a light beam which passes through the center of a pupil of an eye ME of the user M and serves as a central field angle of an image to be viewed is defined as an optical axis 100ax.

As illustrated in FIG. 3, the image display section 110 includes an image generation portion 11, a relay optical system (light guide optical system) 12, and a prism optical element 13. The image generation portion 11 emits image light G containing image information. The image generation portion 11 is formed of, for example, a liquid crystal display element illuminated by a backlight, or an organic EL display element.

The relay optical system 12 guides the image light G emitted from the image generation portion 11 to the prism optical element 13. The relay optical system 12 is an optical system including at least positive power and negative power, and has positive power as a whole. In this embodiment, the relay optical system 12 includes a first lens 12a, a second lens 12b, a third lens 12c, and a fourth lens 12d in an order from a light incident side. In this embodiment, the relay optical system 12 is formed of four lenses, that is, the first lens 12a, the second lens 12b, the third lens 12c, and the fourth lens 12d, but the number of lenses is not particularly limited.

Note that the relay optical system 12 is formed of eccentric surfaces so as to correct aberrations that may be caused by refraction when the light enters the prism optical element 13. Therefore, the optical axis 100ax is bent in actuality, but is illustrated simply as a straight line in FIG. 3.

As illustrated in FIG. 3, the relay optical system 12 has positive power as a whole, and therefore condenses the image light G emitted from the image generation portion 11 to form an intermediate image upstream of the prism optical element 13.

The prism optical element 13 is arranged in front of the eye ME of the user M. The prism optical element 13 includes a prism member (first prism member) 14 and a concave mirror 15. The prism member 14 is formed of, for example, optical resin or optical glass. The prism member 14 has one surface 14a (surface located closer to the eye ME) as a light refractive surface (first light refractive surface) 16, and another surface 14b (surface located away from the eye ME) as a curved surface 17. The light refractive surface 16 is formed of a flat surface. The curved surface 17 has a shape of a convex surface that is convex away from the light refractive surface 16.

The light refractive surface 16 refracts the image light G and guides the image light G to the concave mirror 15. The light refractive surface 16 refracts the image light G in a direction in which the optical axis 100ax is deflected away from the user M.

The concave mirror 15 is formed by, for example, depositing a metal film on the curved surface 17. Therefore, the concave mirror 15 has a shape of a curved surface in conformity with the shape of the curved surface 17. In this embodiment, the concave mirror 15 functions as a concave mirror serving as an ocular optical system, and reflects the image light G emitted from the image generation portion 11 to guide the image light G to the eye ME of the user M satisfactorily. Specifically, the concave mirror 15 condenses the light from the intermediate image to form an exit pupil in the vicinity of the pupil of the eye ME of the user M.

When the image light G reflected by the concave mirror 15 exits from the prism member 14, the image light G is refracted by the light refractive surface 16 and enters the eye ME of the user M. Therefore, the user M can visually recognize an enlarged virtual image through the concave mirror 15.

A further increase in the field angle has been demanded in HMDs in recent years.

Figure 4:
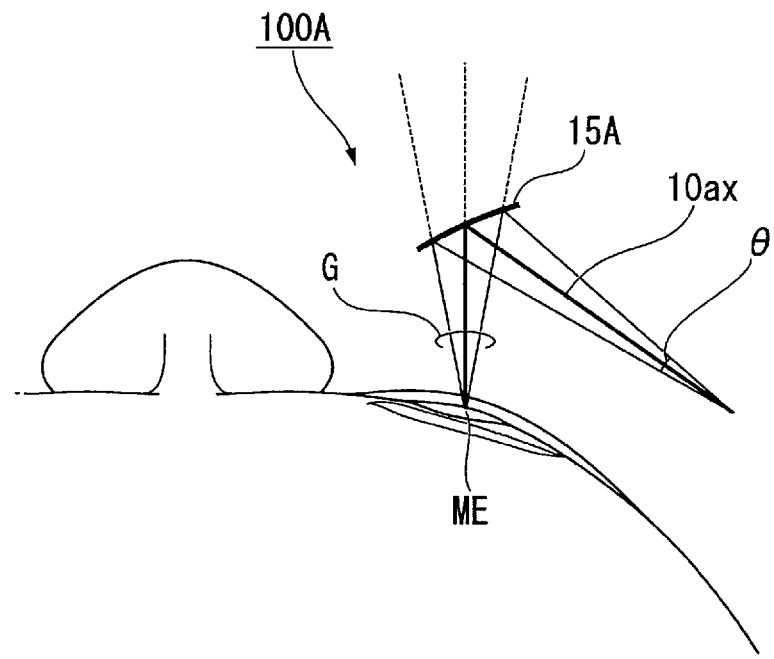
FIG. 4 illustrates the schematic structure of an HMD according to a comparative example.
Figure 5:
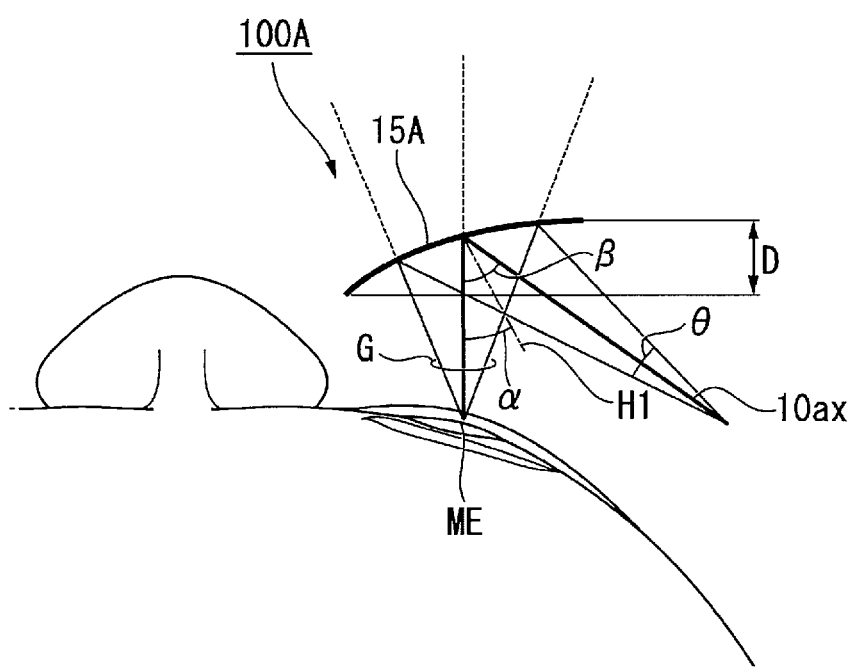
FIG. 5 illustrates the schematic structure of the HMD according to the comparative example.

A problem which may arise when the field angle is increased is described with reference to a comparative example. FIGS. 4 and 5 each illustrate the schematic structure of an HMD 100A according to the comparative example. FIG. 4 illustrates a case where the field angle is reduced in the HMD 100A, and FIG. 5 illustrates a case where the field angle is increased in the HMD 100A. The HMD 100A according to the comparative example is different from the HMD 300 of this embodiment in that the image light G is guided to the eye ME of the user M by a concave mirror 15A alone. In FIGS. 4 and 5, a path of a light beam which passes through the center of the pupil of the eye ME of the user M and serves as a central field angle of the image light G to be viewed is defined as an optical axis 10ax.

As illustrated in FIG. 4, the concave mirror 15A is arranged so that the curved surface thereof is closer to the face of the user M on the nose side, and away from the face on the ear side. When a field angle θ is increased, the amount of protrusion of the concave mirror 15A (hereinafter referred to as mirror protrusion amount D) is increased as illustrated in FIG. 5. The increase in the mirror protrusion amount D is not preferred because the external design of the device is impaired.

In view of the above, it is conceivable to reduce the mirror protrusion amount D while maintaining the field angle θ. As a method for reducing the mirror protrusion amount D while maintaining the field angle θ as described above, it is conceivable to reduce an inclination angle α of the concave mirror 15A. The inclination angle α herein refers to an angle formed between a mirror surface normal H1 of the concave mirror 15A and the optical axis 10ax.

However, FIG. 5 demonstrates that the reduction in the inclination angle α causes a reduction in a deflection angle β of the optical axis 10ax that is deflected by the concave mirror 15A. As a result, there arises a problem in that an image generation portion 11 and a relay optical system 12 are arranged closer to the head of the user M and therefore brought into contact with the head.

In contrast, with the HMD 300 of this embodiment, the image light G can be refracted by the light refractive surface 16 of the prism optical element 13. Specifically, even when the inclination angle α is reduced in order to reduce the mirror protrusion amount D, the optical axis 100ax is bent through the refraction of the image light G by the light refractive surface 16. As a result, the image generation portion 11 and the relay optical system 12 can be located at positions where neither the image generation portion 11 nor the relay optical system 12 is in contact with the head of the user M.

For example, even when the inclination angle α needs to be set to 30 degrees in FIG. 5, the inclination angle α can be reduced to 15 degrees in this embodiment through the use of the prism optical element 13. Further, even when the deflection angle β illustrated in FIG. 5 is set to about 60 degrees, neither the image generation portion 11 nor the relay optical system 12 is in contact with the head of the user M.

For example, when a virtual image having a horizontal field angle of 40 degrees is made viewable, the mirror protrusion amount D is about 17 mm in the structure that uses the concave mirror 15A alone as illustrated in FIG. 4. However, the mirror protrusion amount D can be reduced to about 10 mm in the structure that uses the prism optical element 13 as in this embodiment.

According to this embodiment, the mirror protrusion amount D is reduced through the use of the prism optical element 13. Thus, the external design of the HMD 300 can be enhanced by reducing the thickness of the member located in front of the eye ME of the user M.

Accordingly, it is possible to provide the HMD 300 that allows the user M to visually recognize a large image without impairing the external appearance of the device while suppressing the contact between the HMD 300 and the head of the user M.

Second Embodiment

Figure 6:
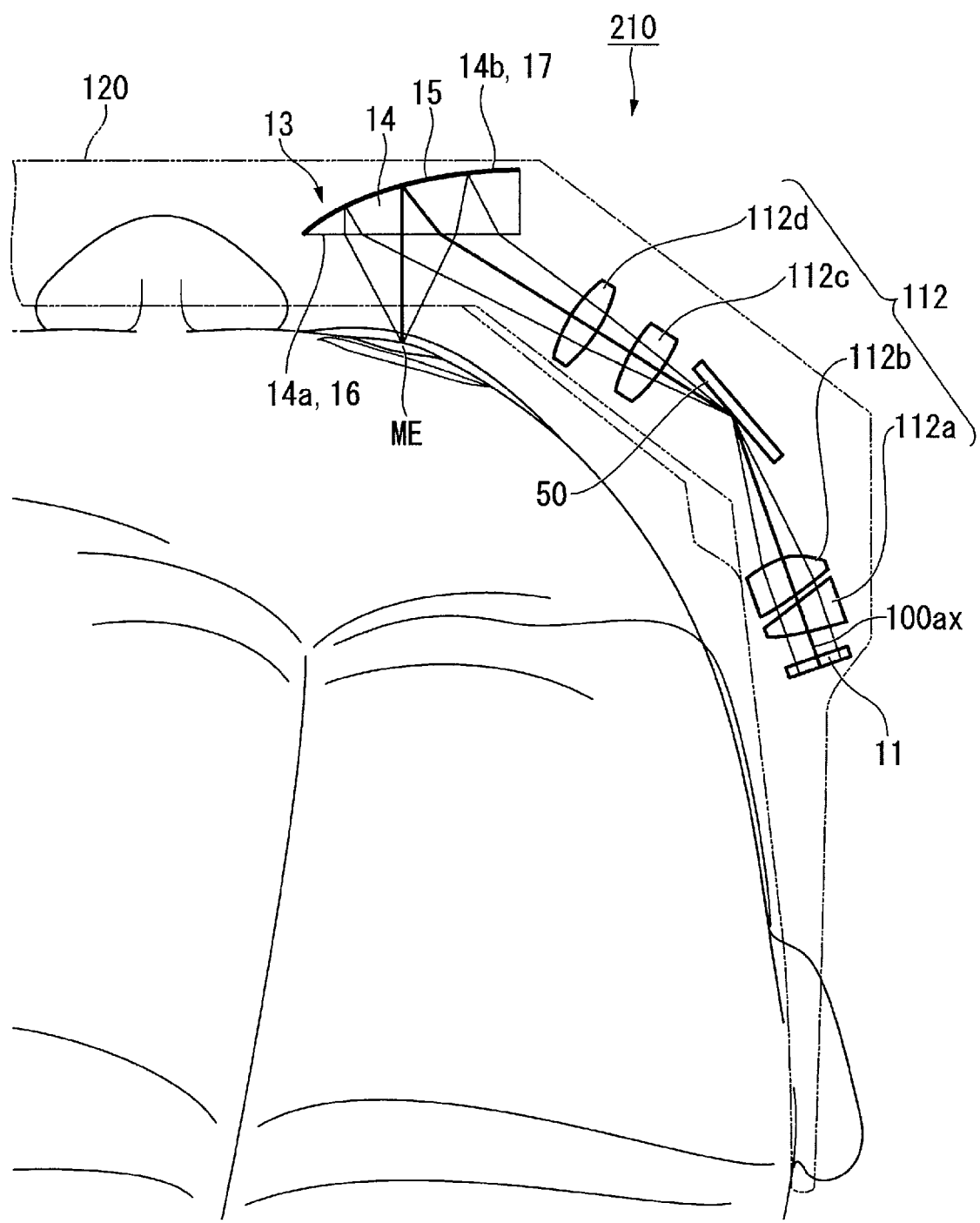
FIG. 6 is a plan view illustrating the structure of each portion of an image display section of a second embodiment.

Next, an image display section according to a second embodiment is described. FIG. 6 is a plan view illustrating the structure of each portion of an image display section 210 of this embodiment. In FIG. 6, members in common with those of the above-referenced embodiment are denoted by the same reference symbols, and detailed description thereof is omitted. FIG. 6 illustrates only a principal light beam of the image light G that is emitted from pixels of the image generation portion 11.

As illustrated in FIG. 6, the image display section 210 of this embodiment includes the image generation portion 11, a relay optical system 112, and the prism optical element 13. In this embodiment, the relay optical system 112 includes a reflective mirror 50 provided between the image generation portion 11 and the prism optical element 13. The reflective mirror 50 reflects the image light G to bend the optical axis 100ax.

Specifically, the relay optical system 112 includes a first lens 112a, a second lens 112b, a third lens 112c, a fourth lens 112d, and the reflective mirror 50. The reflective mirror 50 is arranged between the second lens 112b and the third lens 112c.

The image light G passes through the first lens 112a and the second lens 112b, and is then reflected by the reflective mirror 50 so as to pass through the third lens 112c and the fourth lens 112d. Therefore, the optical axis 100ax of the image light G is bent along the contour of the face of the user M by the reflective mirror 50. Thus, the relay optical system 112 and the image generation portion 11 are arranged along the face of the user M. Accordingly, it is possible to provide the image display section 210 that is reduced in size and excellent in external design. As a result, an HMD including the image display section 210 is also reduced in size and excellent in designability per se.

Third Embodiment

Figure 7:
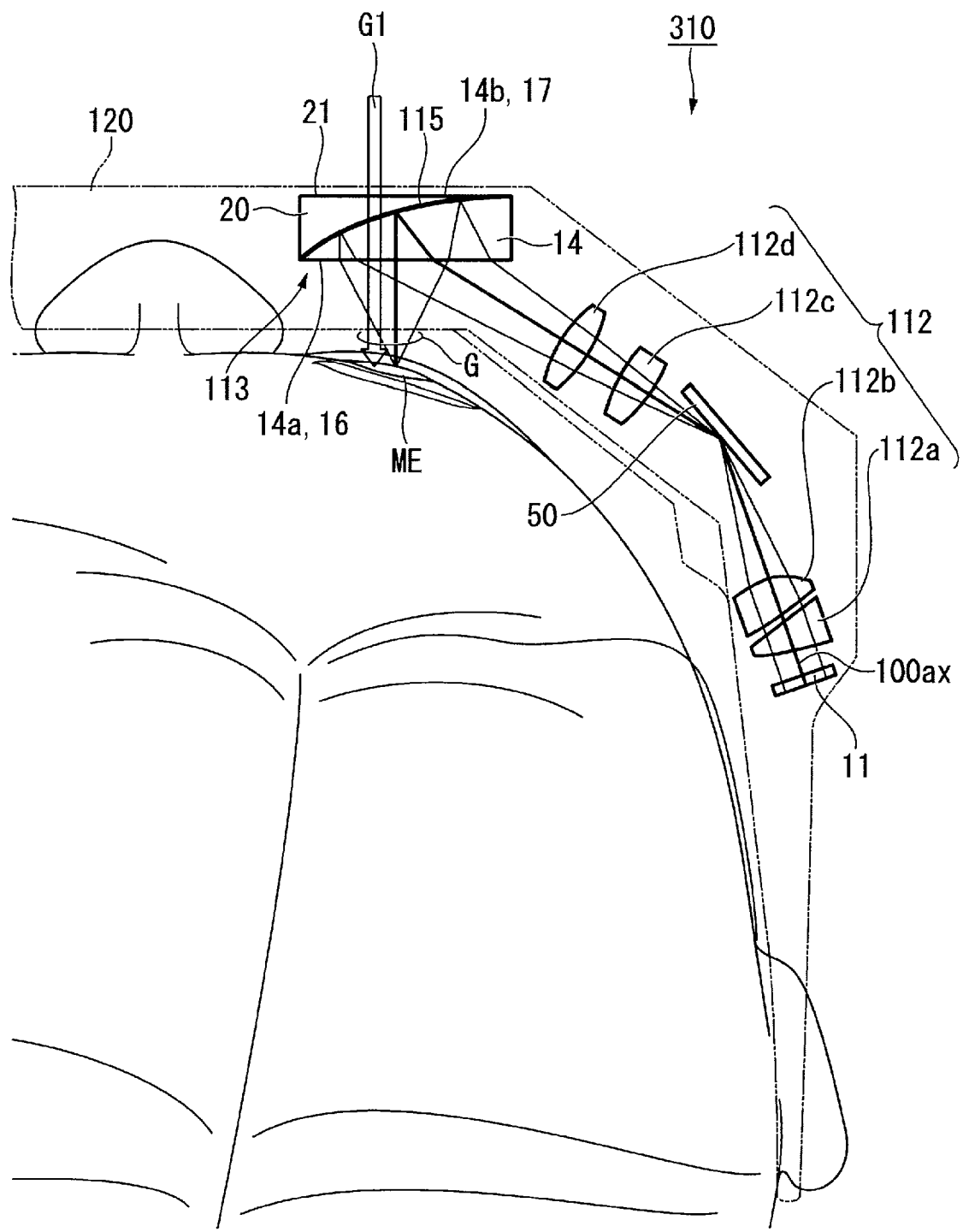
FIG. 7 is a plan view illustrating the structure of each portion of an image display section of a third embodiment.

Next, an image display section according to a third embodiment is described. FIG. 7 is a plan view illustrating the structure of each portion of an image display section 310 of this embodiment. In FIG. 7, members in common with those of the above-referenced embodiments are denoted by the same reference symbols, and detailed description thereof is omitted. FIG. 7 illustrates only a principal light beam of the image light G that is emitted from pixels of the image generation portion 11.

In the first and second embodiments, the image display device to be used for a reflective HMD is taken as an example. The image display section of this embodiment is different in that the image display section is used for a so-called see-through HMD configured so that the image light is superimposed on an external environment.

As illustrated in FIG. 7, the image display section 310 of this embodiment includes the image generation portion 11, the relay optical system 112, and a prism optical element 113.

In this embodiment, the prism optical element 113 includes the prism member 14, a prism member (second prism member) 20, and a concave mirror 115 formed of a partially reflective film. For example, a half-silvered mirror may be used as the partially reflective film that forms the concave mirror 115. As the half-silvered mirror, there may be used a metal thin film obtained by forming an extremely thin film of metal to cause a proportion of the intensity of incident light to pass therethrough.

Note that the metal thin film that forms the half-silvered mirror absorbs light significantly, and hence the concave mirror 115 may be formed by using a dielectric multi-layer film. In this case, the concave mirror 115 is formed of an amplitude-division reflective film, thereby being capable of efficiently reflecting the image light G.

Further, a volume hologram layer that reflects (diffracts) only light having a specific wavelength may be used as the concave mirror 115. In this case, the concave mirror 115 is formed of a wavelength-division reflective film, thereby being capable of efficiently reflecting light which is contained in the image light G and falls within a desired wavelength range.

The prism member 20 is provided opposite the prism member 14 with respect to the concave mirror 115. The prism member 20 is formed of, for example, optical resin or optical glass, and has a refractive index substantially equal to that of the prism member 14.

The prism member 20 has an outer light refractive surface (second light refractive surface) 21 provided opposite the concave mirror 115 parallel to the light refractive surface 16, that is, formed of a flat surface.

When only the prism member 14 is arranged in front of the eye ME of the user M, the external environment may be viewed in a distorted manner. In contrast, according to this embodiment, the prism member 20 is arranged on the external environment side of the concave mirror 115 to compensate the optical path of the light from the external environment, thereby suppressing the risk of viewing the external environment in a distorted manner.

Specifically, the refractive indices of the optical resin (prism member 14) located on the eye ME side with respect to the concave mirror 115 and the optical resin (prism member 20) located on the external environment side with respect to the concave mirror 115 are set substantially equal to each other to prevent light from being refracted by the curved surface 17 of the prism member 14.

As described in the first embodiment, when a large virtual image having a horizontal field angle of about 40 degrees is viewed, the mirror protrusion amount D of the prism optical element 113 is about 10 mm. When the external environment is viewed through such a thick prism member, the see-through image is liable to be distorted.

In contrast, with the prism optical element 113 of this embodiment, the light incident surface and the light exit surface of the light from the external environment are parallel flat surfaces, and hence there is no change between the angle of the light beam that enters the prism optical element 113 from the external environment and the angle of the light beam that exits after being refracted by the prism optical element 113. Therefore, the image of the external environment (see-through image G1) that is viewed through the concave mirror 115 is not distorted, and hence the feelings of fatigue and dissatisfaction of the user M of the HMD are reduced when the user M uses the HMD.

Thus, the user M that uses the HMD of this embodiment can visually recognize an image obtained by superimposing the image light G from the image generation portion 11 on the see-through image G1 having no distortion.

Note that the technical scope of the invention is not limited to the embodiments mentioned above, and various modifications may be made without departing from the spirit of the invention.

The entire disclosure of Japanese Patent Application No. 2016-059676, filed Mar. 24, 2016 is expressly incorporated by reference herein.

What is claimed is:
1. A head-mounted image display device, comprising:
an image generation portion that emits image light; and
a prism optical element into which the image light enters, the prism optical element including:
  a first prism member having a first light refractive surface with a shape of a flat surface,
  a concave mirror provided opposite the first light refractive surface of the first prism member and having a shape that is concave away from the first light refractive surface, and
  a second prism member provided opposite the first prism member with respect to the concave mirror, the second prism member having: (i) a refractive index equal to a refractive index of the first prism member, and (ii) a second light refractive surface provided opposite the concave mirror parallel to the first light refractive surface, wherein:
the prism optical element is arranged so that the image light enters the prism optical element through the first light refractive surface and is reflected by the concave mirror, and
the concave mirror is a partially reflective film that reflects at least a part of the image light and causes at least a part of light in an external environment to pass there-through.

2. The head-mounted image display device according to claim 1, further comprising
a light guide optical system that guides the image light to the prism optical element, wherein
the light guide optical system includes a plurality of lenses.

3. The head-mounted image display device according to claim 2, wherein the light guide optical system further includes a reflective mirror that is provided between the plurality of lenses and reflects the image light.

4. The head-mounted image display device according to claim 1, wherein the partially reflective film is an amplitude-division reflective film.

5. The head-mounted image display device according to claim 1, wherein the partially reflective film is a wavelength-division reflective film.

6. The head-mounted image display device according to claim 1, wherein the image light is reflected by the concave mirror out through the first light refractive surface.

\* \* \* \* \*